(12) United States Patent
Zou et al.

(10) Patent No.: US 8,842,391 B2
(45) Date of Patent: Sep. 23, 2014

(54) RECORDING HEAD INCLUDING A NEAR FIELD TRANSDUCER

(71) Applicant: Seagate Technology LLC, Cupertino, CA (US)

(72) Inventors: Jie Zou, Eden Prairie, MN (US); Kaizhong Gao, Eden Prairie, MN (US); William Albert Challener, Glenville, NY (US); Mark Henry Ostrowski, Lakeville, MN (US); Venkateswara Rao Inturi, Shakopee, MN (US); Tong Zhao, Eden Prairie, MN (US); Michael Christopher Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/062,675

(22) Filed: Oct. 24, 2013

(65) Prior Publication Data
US 2014/0050058 A1  Feb. 20, 2014

Related U.S. Application Data

(63) Continuation-in-part of application No. 13/928,445, filed on Jun. 27, 2013, now Pat. No. 8,670,215, which is a continuation of application No. 13/678,017, filed on Nov. 15, 2012, now Pat. No. 8,477,454, which is a continuation of application No. 13/032,673, filed on Feb. 23, 2011, now Pat. No. 8,339,740, application No. 14/062,675, which is a continuation-in-part of application No. 13/795,634, filed on Mar. 12, 2013.

(60) Provisional application No. 61/307,129, filed on Feb. 23, 2010, provisional application No. 61/637,696, filed on Apr. 24, 2012.

(51) Int. Cl.
*G11B 5/02* (2006.01)

(52) U.S. Cl.
USPC ........................................... 360/125.31

(58) Field of Classification Search
USPC ........................................... 360/125.31
See application file for complete search history.

(56) References Cited

U.S. PATENT DOCUMENTS

| | | | |
|---|---|---|---|
| 7,002,228 B2 * | 2/2006 | Deak et al. | 257/421 |
| 7,262,936 B2 * | 8/2007 | Hamann et al. | 360/128 |
| 7,791,839 B2 * | 9/2010 | Olson et al. | 360/125.31 |
| 7,986,592 B2 | 7/2011 | Hirano | |
| 8,116,034 B2 * | 2/2012 | Komura et al. | 360/125.31 |
| 8,194,511 B2 | 6/2012 | Sasaki | |
| 8,213,272 B2 | 7/2012 | Takayama | |
| 8,223,597 B2 | 7/2012 | Komura | |
| 8,284,521 B2 | 10/2012 | Ohtsu | |
| 8,284,635 B2 | 10/2012 | Matsumoto | |
| 8,289,650 B2 | 10/2012 | Seigler | |

(Continued)

*Primary Examiner* — Mark Blouin

(74) *Attorney, Agent, or Firm* — Mueting Raasch & Gebhardt P.A.

(57) ABSTRACT

An apparatus including a near field transducer positioned adjacent to an air bearing surface, the near field transducer including an electrically conductive nitride; a first magnetic pole; and a heat sink, a diffusion barrier layer, or both positioned between the first magnetic pole and the near field transducer, wherein the heat sink, the diffusion barrier or both include rhodium (Rh) or an alloy thereof; ruthenium (Ru) or an alloy thereof titanium (Ti) or an alloy thereof tantalum (Ta) or an alloy thereof tungsten (W) or an alloy thereof borides; nitrides; transition metal oxides; or palladium (Pd) or an alloy thereof.

20 Claims, 9 Drawing Sheets

(56) References Cited

U.S. PATENT DOCUMENTS

| | | |
|---|---|---|
| 8,320,220 B1 | 11/2012 | Yuan |
| 8,331,205 B2 | 12/2012 | Seigler |
| 8,427,925 B2 | 4/2013 | Zhao |
| 8,451,555 B2 | 5/2013 | Seigler |
| 8,477,454 B2 | 7/2013 | Zou |
| 8,514,673 B1 | 8/2013 | Zhao |
| 2005/0190496 A1 | 9/2005 | Hamann |
| 2007/0069383 A1 | 3/2007 | Suzuki |
| 2009/0073858 A1 | 3/2009 | Seigler |
| 2010/0128579 A1 | 5/2010 | Seigler |
| 2010/0214685 A1 | 8/2010 | Seigler |
| 2010/0309581 A1 | 12/2010 | Wu |
| 2011/0205863 A1 | 8/2011 | Zhao |
| 2012/0105996 A1 | 5/2012 | Katine |
| 2012/0127839 A1 | 5/2012 | Rawat |
| 2013/0235707 A1 | 9/2013 | Zhao |
| 2013/0286799 A1 | 10/2013 | Zhu |
| 2013/0286804 A1 | 10/2013 | Zhao |

* cited by examiner

RECORDING HEAD INCLUDING A NEAR FIELD TRANSDUCER

This application is a continuation-in-part of: U.S. patent application Ser. No. 13/928,445 filed Jun. 27, 2013, which is a continuation of U.S. patent application Ser. No. 13/678,017, filed Nov. 15, 2012, now U.S. Pat. No. 8,477,454, which is a continuation of U.S. patent application Ser. No. 13/032,673, filed Feb. 23, 2011, now U.S. Pat. No. 8,339,740, which claims the benefit of U.S. Provisional Patent Application No. 61/307,129, filed Feb. 23, 2010, and titled "Diffusion Barrier For HAMR Head Between NFT And Writer (Recording Head For Heat Assisted Magnetic Recording)"; and U.S. patent application Ser. No. 13/795,634 which claims the benefit of U.S. Provisional Patent Application No. 61/637,696 and titled "NEAR FIELD TRANSDUCERS (NFTs) INCLUDING NITRIDES", the disclosures of which are incorporated herein by reference thereto.

SUMMARY

An apparatus including a near field transducer positioned adjacent to an air bearing surface, the near field transducer including an electrically conductive nitride; a first magnetic pole; and a heat sink, a diffusion barrier layer, or both positioned between the first magnetic pole and the near field transducer, wherein the heat sink, the diffusion barrier or both include rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

An apparatus including a near field transducer positioned adjacent to an air bearing surface, the near field transducer including an electrically conductive nitride; a first magnetic pole; and a heat sink positioned between the first magnetic pole and the near field transducer, wherein the heat sink includes rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

An apparatus including a near field transducer positioned adjacent to an air bearing surface of the apparatus, the near field transducer including an electrically conductive nitride, and wherein the near field transducer includes a disk and a peg, wherein the peg extends from the disk portion to the air bearing surface of the apparatus; a first magnetic pole; a heat sink positioned between the first magnetic pole and the near field transducer; and a diffusion barrier positioned between the near field transducer and the heat sink, the diffusion barrier including rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

An apparatus including a near field transducer positioned adjacent to an air bearing surface, the near field transducer including an electrically conductive nitride, and wherein the near field transducer comprises an antenna; a first magnetic pole; a heat sink positioned between the first magnetic pole and the near field transducer; and a diffusion barrier positioned between the near field transducer and the first magnetic pole, the diffusion barrier including rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
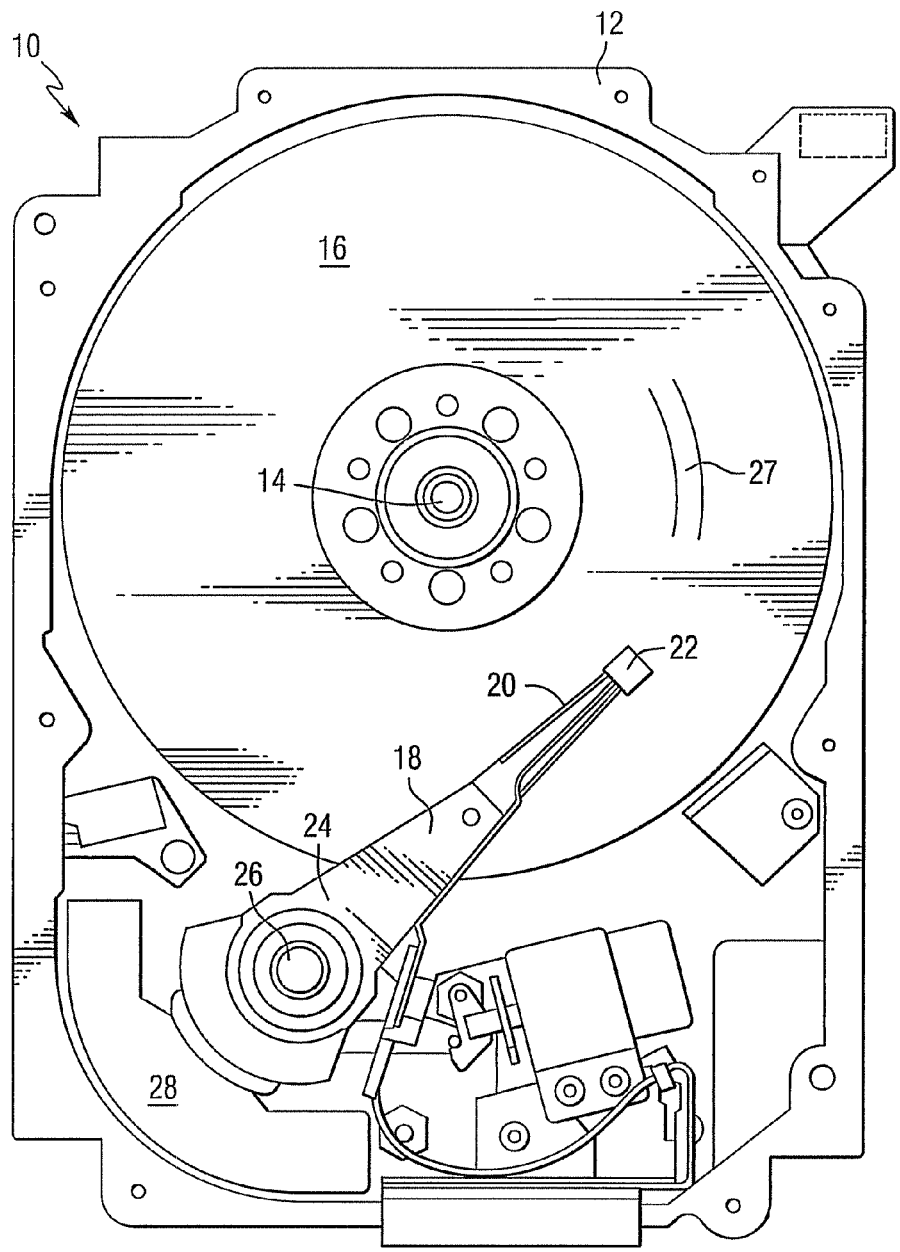
FIG. 1 is a pictorial representation of a data storage device in the form of a disc drive that can include a recording head constructed in accordance with an aspect of this disclosure.

FIG. 1 is a pictorial representation of a data storage device in the form of a disc drive 10 that can utilize recording heads constructed in accordance with various aspects of the disclosure. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light to the storage media for localized heating of the storage media. While FIG. 1 shows a disc drive, the invention can be applied to other devices that include a transducer and a storage media, wherein the storage media is heated to facilitate switching of bits in the storage media.

Figure 2:
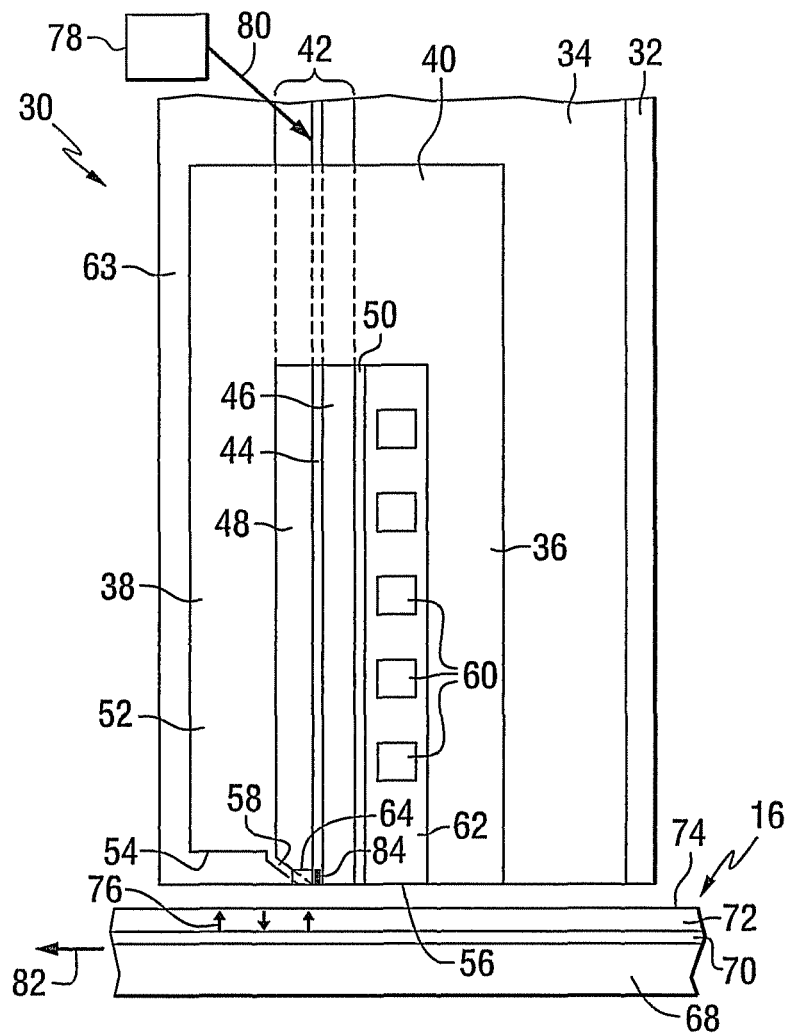
FIG. 2 is a side elevation view of a recording head constructed in accordance with an aspect of the disclosure.

FIG. 2 is a side elevation view of a recording head constructed in accordance with an aspect of the disclosure, and positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material such as, for example, Au.

As illustrated in FIG. 2, the recording head 30 includes a structure for heating the magnetic storage media 16 proximate to where the write pole 58 applies the magnetic write field H to the storage media 16. The media 16 includes a substrate 68, a heat sink layer 70, a magnetic recording layer 72, and a protective layer 74. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near field transducer (NFT) 84 is positioned in or adjacent to the waveguide and at or near the air bearing surface. The heat sink material may be chosen such that it does not interfere with the resonance of the NFT. In various embodiments, the near field transducer can take the form of an antenna. FIGS. 10, 11, 13 and 14 show the shapes of several different embodiments of the NFT 276, 278, 280 and 282 as viewed from the air bearing surface.

Although the example of FIG. 2 shows a perpendicular magnetic recording head and a perpendicular magnetic storage media, it will be appreciated that the disclosure may also be used in conjunction with other types of recording heads and/or storage media where it may be desirable to concentrate light to a small spot.

Elements in structures surrounding the NFT, such as the magnetic write pole and dielectric layers, can diffuse into the NFT through the NFT heat sink during operation when the NFT is at elevated temperatures. This can potentially degrade the optic properties of the plasmonic materials in the NFT and reduce the coupling efficiency. Furthermore, plasmonic materials in the NFT can also diffuse into the surrounding structures such as magnetic write pole and dielectric layers, degrading the magnetic properties of the write pole and the optical properties of the dielectric layers.

In one aspect, the disclosure provides a HAMR NFT design with improved reliability. A diffusion barrier is included to limit the diffusion of pole materials into the NFT. This design also lowers the NFT temperature.

Figure 3:
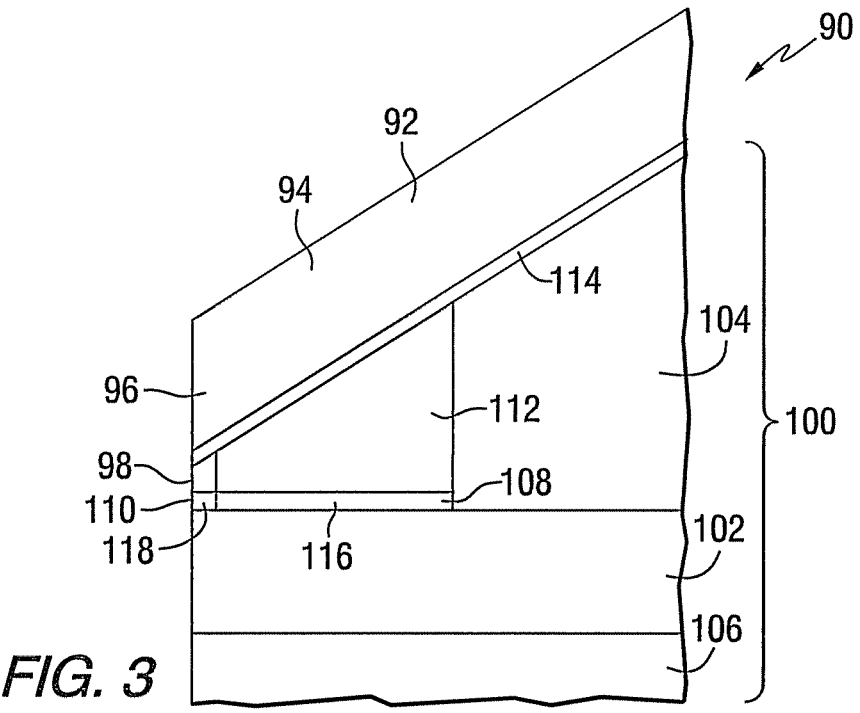
FIG. 3 is a cross-sectional view of a portion of a recording head constructed in accordance with an aspect of the disclosure.

In one embodiment, a diffusion barrier is positioned between the pole and NFT. This embodiment is illustrated in FIG. 3, which is an enlarged view of a portion of a magnetic recording head 90. The recording head includes a magnetic pole 92 that can be made of CoFe, and includes a sloped portion 94 having an end 96 positioned adjacent to an air bearing surface 98. The head further includes a waveguide 100 having a core layer 102 sandwiched between first and second cladding layers 104 and 106. A near field transducer 108 is positioned adjacent to the core layer and has an end 110 positioned adjacent to the air bearing surface. A heat sink 112 is positioned between the NFT and the pole. A diffusion barrier layer 114 is positioned between the magnetic pole and the heat sink. The diffusion barrier limits the diffusion of pole materials into the NFT. The diffusion barrier also doubles as a seed layer for the plating of the CoFe pole. The NFT can be a lollipop design having a disk portion 116 and a peg 118 that extends from the disk portion to the air bearing surface. The heat sink is positioned between the disk portion and the magnetic pole.

Figure 4:
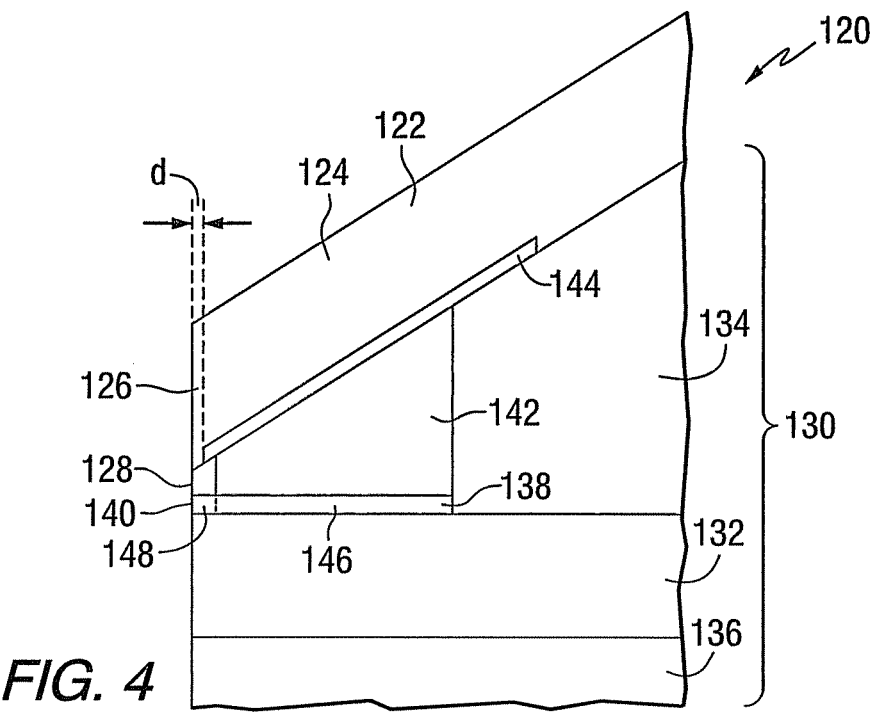
FIG. 4 is a cross-sectional view of a portion of a recording head constructed in accordance with another aspect of the disclosure.

FIG. 4 is a cross-sectional view of a portion of another recording head 120 constructed in accordance with another aspect of the disclosure. The recording head includes a magnetic pole 122 that can be made of CoFe, and includes a sloped portion 124 having an end 126 positioned adjacent to an air bearing surface 128. The head further includes a waveguide 130 having a core layer 132 sandwiched between first and second cladding layers 134 and 136. A near field transducer 138 is positioned adjacent to the core layer and has an end 140 positioned adjacent to the air bearing surface. A heat sink 142 is positioned between the NFT and the pole. A diffusion barrier layer 144 is positioned between the magnetic pole and the heat sink. The diffusion barrier limits the diffusion of pole materials into the NFT. The NFT can be a lollipop design having a disk portion 146 and a peg 148 that extends from the disk portion to the air bearing surface. The heat sink is positioned between the disk portion and the magnetic pole. In this example, the diffusion barrier layer does not extend to the air bearing surface, but rather is spaced from the air bearing surface by a distance d.

In the design of FIG. 3, the addition of the diffusion barrier 114 increases the NFT-to-pole spacing (NPS). Since a small NPS may be desirable for HAMR recording, the designs of FIG. 3 may impose a limitation on the diffusion barrier thickness. The embodiment of FIG. 4 removes this limitation. In FIG. 4, the diffusion barrier is patterned to be recessed from ABS. Thus, the NPS does not include the diffusion barrier in the region near the air bearing surface and the NPS can be reduced.

Figure 5:
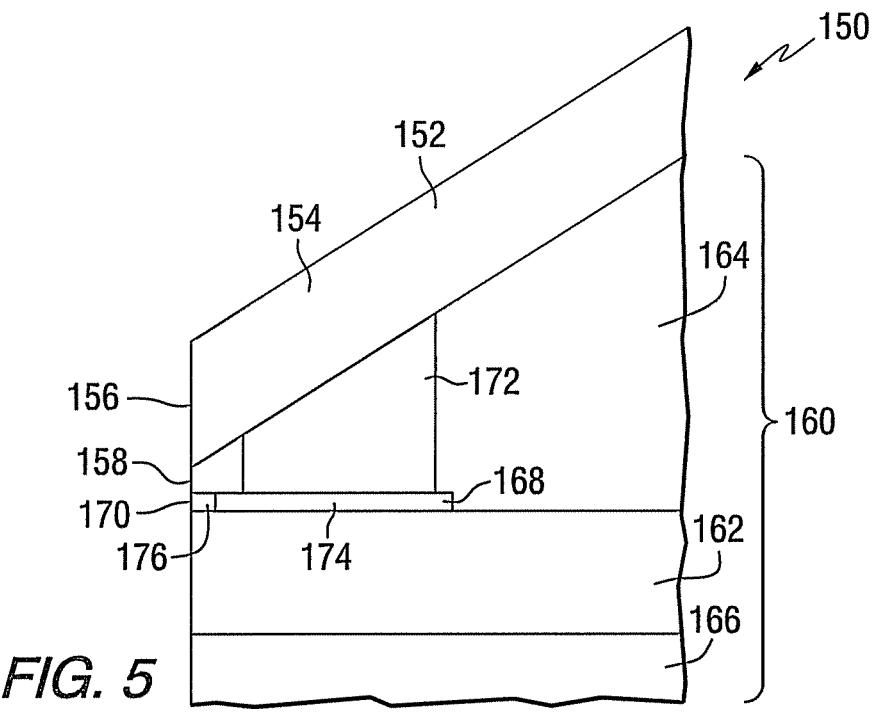
FIG. 5 is a cross-sectional view of a portion of another recording head constructed in accordance with another aspect of the disclosure.

FIG. 5 is a cross-sectional view of a portion of another recording head 150 constructed in accordance with an aspect of the disclosure. The recording head includes a magnetic pole 152 that can be made of CoFe, and includes a sloped portion 154 having an end 156 positioned adjacent to an air bearing surface 158. The head further includes a waveguide 160 having a core layer 162 sandwiched between first and second cladding layers 164 and 166. A near field transducer 168 is positioned adjacent to the core layer and has an end 170 positioned adjacent to the air bearing surface. A heat sink 172 is positioned between the NFT and the pole. In this example, the heat sink is made of a material that also serves as a diffusion barrier. The diffusion barrier limits the diffusion of pole materials into the NFT. The NFT can be a lollipop design having a disk portion 174 and a peg 176 that extends from the disk portion to the air bearing surface. The heat sink is positioned between the disk portion and the magnetic pole.

In the FIG. 5 embodiment, the heat sink uses the diffusion barrier material, instead of the same plasmonic material as the NFT. The heat sink acts as the diffusion barrier between the write pole and the NFT, as well as a heat sink. Example materials and material properties are described below.

Figure 6:
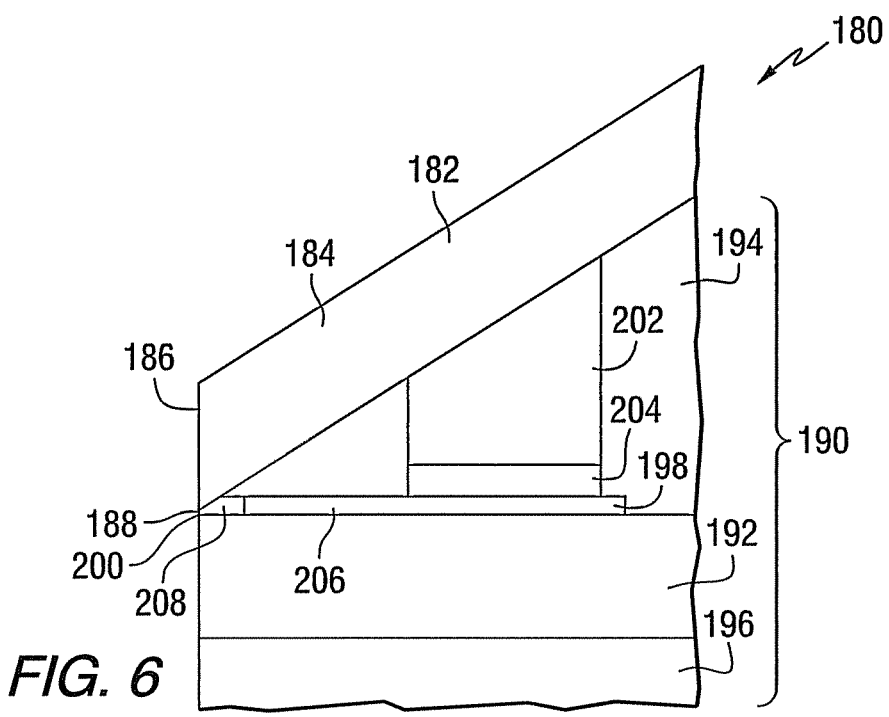
FIG. 6 is a cross-sectional view of another recording head constructed in accordance with another aspect of the disclosure.

FIG. 6 is a cross-sectional view of another recording head 180 constructed in accordance with an aspect of the disclosure. The recording head includes a magnetic pole 182 that can be made of CoFe, and includes a sloped portion 184 having an end 186 positioned adjacent to an air bearing surface 188. The head further includes a waveguide 190 having a core layer 192 sandwiched between first and second cladding layers 194 and 196. A near field transducer 198 is positioned adjacent to the core layer and has an end 200 positioned adjacent to the air bearing surface. A heat sink 202 is positioned between the NFT and the pole. A diffusion barrier layer 204 is positioned between the NFT and the heat sink. The diffusion barrier limits the diffusion of pole materials into the NFT. The NFT can be a lollipop design having a disk portion 206 and a peg 208 that extends from the disk portion to the air bearing surface. The diffusion barrier layer is positioned between the disk portion and the heat sink. In the embodiment of FIG. 6, the heat sink has a bi-layer structure, where the bottom part is the diffusion barrier while the upper part still uses Au. For a similar bi-layer structure, the material order can be reversed, where the bottom part is the plasmonic material such as Au and the upper part is the diffusion barrier material. Such a bi-layer structure can also be repeated to form multi-layer structure.

Figure 7:
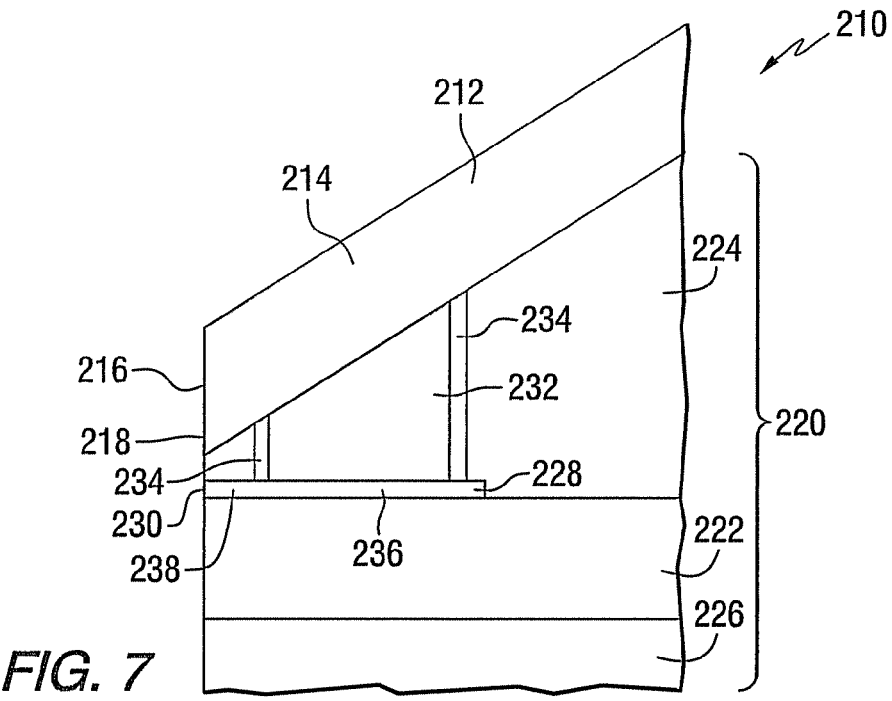
FIG. 7 is a cross-sectional view of another recording head constructed in accordance with another aspect of the disclosure.

FIG. 7 is a cross-sectional view of another multilayer recording head 210 constructed in accordance with an aspect of the disclosure. The recording head includes a magnetic pole 212 that can be made of CoFe, and includes a sloped portion 214 having an end 216 positioned adjacent to an air bearing surface 218. The head further includes a waveguide 220 having a core layer 222 sandwiched between first and second cladding layers 224 and 226. A near field transducer 228 is positioned adjacent to the core layer and has an end 230 positioned adjacent to the air bearing surface. A heat sink 232 is positioned between the NFT and the pole. A diffusion barrier layer 234 is positioned around the heat sink. The diffusion barrier limits the diffusion of waveguide cladding materials into the NFT. The NFT can be a lollipop design having a disk portion 236 and a peg 238 that extends from the disk portion to the air bearing surface. In the embodiment of FIG. 7, a diffusion barrier shell is positioned outside the NFT heat sink, to provide protection against potential diffusion or reaction between the NFT heat sink and surrounding clad layer. One additional benefit of this embodiment is the potential enhanced adhesion between the heat sink and clad layers.

Figure 8:
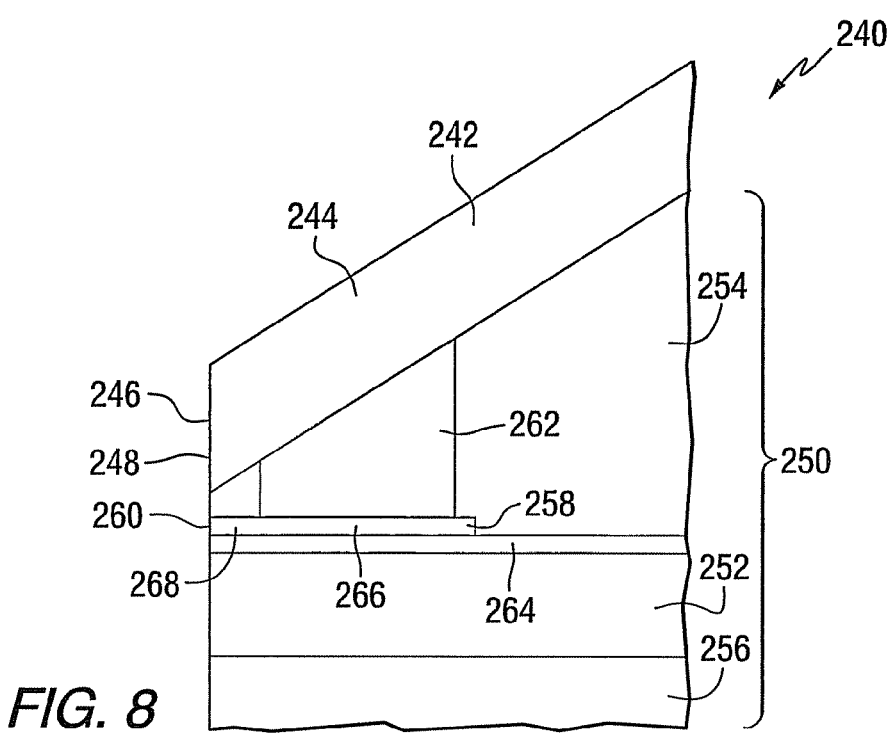
FIG. 8 is a cross-sectional view of another recording head constructed in accordance with another aspect of the disclosure.

FIG. 8 is a cross-sectional view of another recording head 240 constructed in accordance with an aspect of the disclosure. The recording head includes a magnetic pole 242 that can be made of CoFe, and includes a sloped portion 244 having an end 246 positioned adjacent to an air bearing surface 248. The head further includes a waveguide 250 having a core layer 252 sandwiched between first and second cladding layers 254 and 256. A near field transducer 258 is positioned adjacent to the core layer and has an end 260 positioned adjacent to the air bearing surface. A heat sink 262 is positioned between the NFT and the pole. A diffusion barrier layer 264 is positioned between the NFT and the core layer. The diffusion barrier limits the diffusion of core layer material into the NFT. The NFT can be a lollipop design having a disk portion 266 and a peg 268 that extends from the disk portion to the air bearing surface. In the embodiment of FIG. 8, a diffusion barrier is added under the NFT, to provide protection against diffusion between the plasmonic material of the NFT and the core or cladding layer under the NFT. One additional benefit of this embodiment is the potential enhanced adhesion of the NFT on the core or cladding layer underneath.

Other embodiments can include various combinations of the features of the embodiments of FIGS. 3-8.

Figure 9:
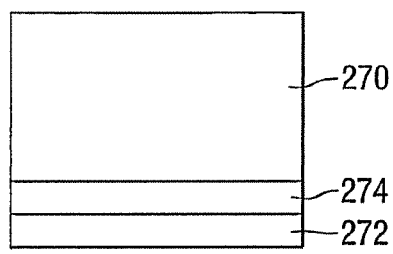
FIG. 9 is a plan view of a portion of an air bearing surface of a recording head.
Figure 10:
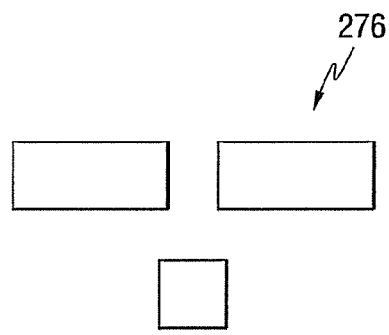
FIGS. 10-13 are schematic representations of near field transducers.
Figure 11:
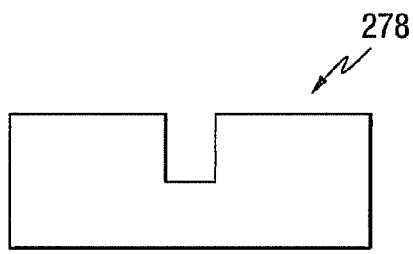
Figure 12:
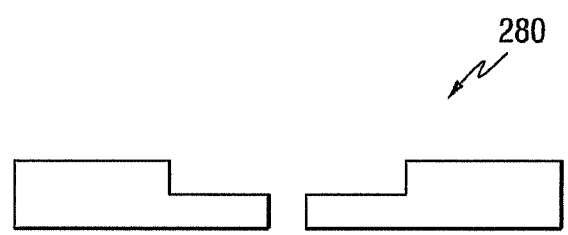
Figure 13:
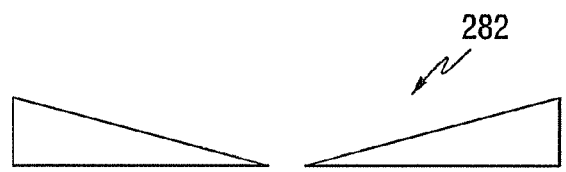

The disclosure is not limited to the embodiments of FIGS. 3-8. For a more generalized case, the HAMR head basic structure will include: a transducer with a plasmonic metallic layer, a metallic layer and a ferromagnetic metallic layer, where the center layer is preferred to be a non-magnetic, non-plasmonic layer. FIG. 9 is an air bearing surface view of a magnetic pole 270 separated from a plasmonic material NFT 272 by a non-magnetic, non-plasmonic material 274.

While certain materials are set forth above in the described embodiments, it should be understood that other materials can be used in place of the materials described in the particular embodiments. The specific materials used can be chosen in accordance with the following criteria. In one embodiment, the diffusion percentage between the plasmonic material and the non-magnetic, non-plasmonic layer may be less than 2% at 400° C. and the diffusion percentage between the non-magnetic, non-plasmonic layer and the NFT may be less than 2% at 400° C. Materials for the diffusion barrier should have very low solubility in the plasmonic NFT materials. Furthermore, the materials should have good thermal conductivity, so that heat can be efficiently dissipated.

In some embodiments, diffusion barrier materials can include, for example, rhodium (Rh) and its alloys; ruthenium (Ru) and its alloys; titanium (Ti), and its alloys; tantalum (Ta), and its alloys; tungsten (W) and its alloys; borides; nitrides; transition metal oxides; and palladium (Pd) and its alloys. Exemplary Ti alloys can include, for example TiC, TiN, TiCN, TiPd, and $Ti_3Pd$. Exemplary Ta alloys can include, for example TaC, TaN, and TaCN. Exemplary W alloys can include, for example WN, WCN, WTi, and WTiN. Exemplary borides can include, for example, $ZrB_2$, $TiB_2$, $HfB_2$, $MgB_2$, and $VB_2$. Exemplary nitrides can include, for example TaN, and TiN. In some embodiments, diffusion barrier materials can include nickel phosphorus (NiP).

Since magnetic materials generally have relatively poor thermal conductivity, the addition of a better thermally conductive diffusion barrier may dissipate heat better and lower the NFT temperature. This may further improve the NFT reliability. In some embodiments, the plasmonic NFT can be selected from Au, Ag, Cu or alloys thereof. The non-magnetic, non-plasmonic layer can be a laminated structure. The non-magnetic, non-plasmonic layer can be wrapped around the magnetic pole material. The magnetic pole material might include, for example, Co, Fe, and Ni, or alloys containing Co, Fe and/or Ni.

Materials that are to be used in disclosed NFTs generally are plasmonic materials. The plasmonic nature of a material can be estimated based on the refractive index (n) and the extinction coefficient (k). Table I shows optical properties (n and k), thermal conductivity and coefficient of thermal expansion (CTE) for various materials. Table I also provides a figure of merit (FOM) for surface plasmon generation (($n^2 - k^2$)/2nk).

TABLE I

Optical Properties of Various Materials

| Material | n @ 830 nm | k @ 830 nm | FOM ($n^2 - k^2$)/2nk |
|---|---|---|---|
| Ag | 0.15 | 5.52 | −18.39 |
| Au | 0.19 | 5.42 | −14.25 |
| Cu | 0.26 | 5.29 | −10.15 |
| TiN | 0.99 | 3.60 | −1.68 |
| ZrN | 0.88 | 4.55 | −2.50 |
| Ta | 1.09 | 3.75 | −1.57 |
| Al | 2.72 | 8.29 | −1.36 |
| Rh | 2.78 | 6.97 | −1.05 |
| Pd | 2.09 | 5.22 | −1.05 |
| Ir | 2.65 | 5.39 | −0.77 |
| Co | 2.54 | 4.91 | −0.71 |
| Pt | 2.93 | 5.08 | −0.58 |
| Fe | 2.94 | 3.41 | −0.15 |
| Ti | 2.99 | 3.32 | −0.10 |
| Mo | 3.53 | 3.30 | 0.07 |
| V | 3.47 | 3.18 | 0.09 |
| W | 3.48 | 2.79 | 0.22 |
| Ru | 4.98 | 3.88 | 0.25 |

As seen from Table 1, the currently measured properties for ZrN and TiN are only lower than those of Ag, Au, and Cu, and are therefore favorable candidates among all alternative plasmonic materials considered. Furthermore, the deposition processes of ZrN and TiN can be affected in order to improve the optical properties. Table II below shows nanoindentation hardness and coefficient of thermal expansion (CTE) of various materials.

TABLE II

Hardness and CTE of Various Materials

| Material | Nanoindentation Hardness (GPa) | Coefficient of Thermal Expansion ($\times 10^{-6}$/K) |
|---|---|---|
| AlO | — | 5 |
| $SiO_2$ | — | 3 |
| TaO | — | 6 |
| Au | ~2 | 14.2 |
| TiN | 18-21 | 9.35 |
| ZrN | 20-40 | 9.4 |

As seen from Table II, the nanoindentation hardness of ZrN is 20-40 GPa and that of Tin is 18-21 GPa. These values are an order of magnitude higher than that of Au (around 2 GPa). Furthermore, the CTE of ZrN ($9.4 \times 10^{-6}$/K) and TiN ($9.35 \times 10^{-6}$/K) are about 40% lower than that of Au and are closer to the oxide waveguide materials that surround the NFT. This could lead to lesser thermal stresses during HAMR operation.

Disclosed herein are NFTs that include an electrically conductive nitride material. Exemplary electrically conductive nitride materials can include, for example, ZrN, TiN, TaN, HfN, or combinations thereof. In some embodiments NFTs can include ZrN, TiN, or combinations thereof.

In some embodiments, the entire NFT can be made of a nitride material. In some embodiments, the entire NFT can be made of ZrN, TiN, or some combination thereof. In some embodiments, the NFT could be a lollypop type design, a nanorod type design, or any other type of NFT design. In some embodiments, a lollypop type NFT can be made entirely of a nitride material. In some embodiments, a nanorod type NFT can be made entirely of a nitride material.

In some embodiments, only a part of a NFT is made of a nitride material. In some embodiments, such a NFT could be a lollypop type design, a nanorod type design, or any other type of NFT design. In some embodiments, only the peg (see peg 118 in FIG. 4) of a NFT can be made of a nitride material and the remainder of the NFT (i.e., the disk shaped portion 116 in FIG. 4) can be made of a different material, for example, gold, silver, copper, or alloys thereof. Such an embodiment could improve the reliability of the NFT at the ABS due to superior thermo-mechanical properties of the nitride material over gold. Although there may be some coupling efficiency loss, the loss may be low and within an acceptable range due to the large disc surface area or volume which would still be gold.

Figure 14A:
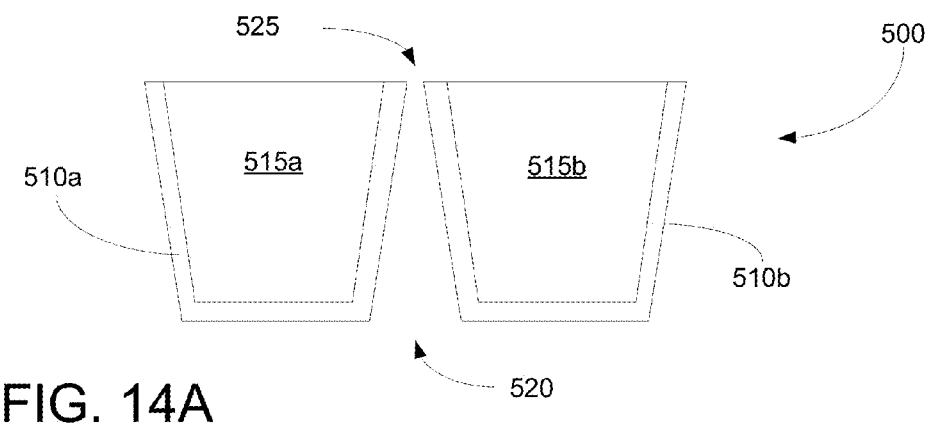
FIG. 14A depicts a schematic of a cross section of a disclosed NFT.

In some embodiments, only one or more portions of a NFT is made of a nitride material. An example of an NFT that could have one or more portions thereof made of a nitride material can include embodiments such as that depicted in FIG. 14A. The NFT 500 in FIG. 14A is a nanorod type NFT where each of the rods includes a nitride base layer 510a and 510b on the bottom 520 (opposite the top 525 of the NFT) of the individual rods of the NFT and a non-nitride core 515a and 515b. In some embodiments, the non-nitride cores 515a and 515b can be, for example, gold, silver, copper, or alloys thereof. In some embodiments, the nitride base layer 510a and 510b can have a thickness that is at least 5 Å. In some embodiments, the nitride base layer 510a and 510b can have a thickness that is from 1 Å to 20 Å.

Figure 14B:
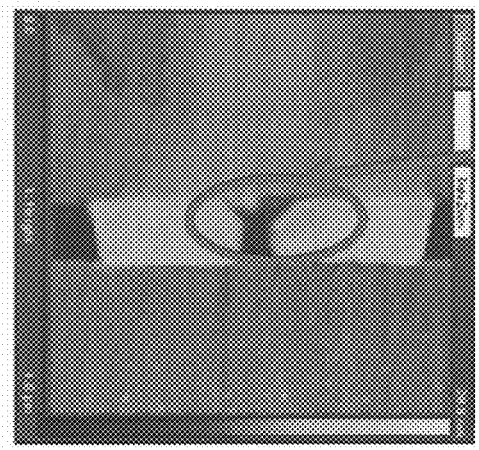
FIGS. 14B and 14C are an atomic force microscopy (AFM) image and a tunneling electron microscope (TEM) image of a previously utilized NFT that shows corner rounding.
Figure 14C:
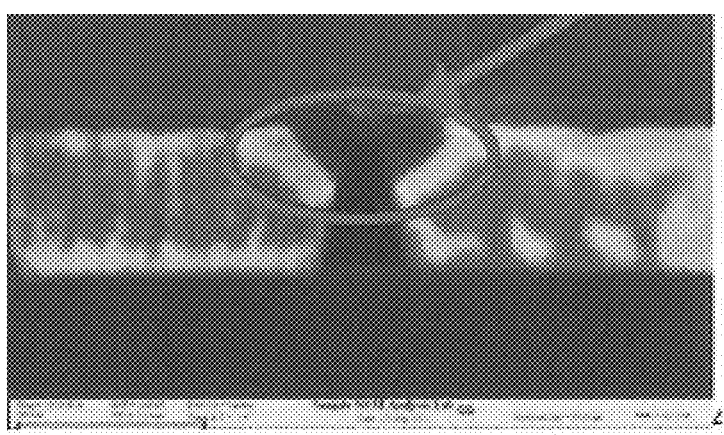

NFTs that include such nitride base layers can enhance mechanical properties of NFTs without significantly sacrificing the coupling efficiency. In some embodiments, such nitride base layers could function to reduce, minimize or eliminate corner rounding issues that have been seen in (for example) gold nanorod type NFTs. FIGS. 14B and 14C show atomic force microscopy (AFM) and tunneling electron microscope (TEM) images of gold nanorod type NFTs that show corner rounding. The location of the corner rounding appears to correlate with the location of the highest stress points at the corners of the rods (the gold/dielectric interface), as predicted by thermo-mechanical modeling. Embodiments such as that depicted in FIG. 14A may mitigate the corner rounding problem and should have reduced coupling efficiency penalties due to the relatively small amount of nitride material present in the overall NFT.

Figure 15:
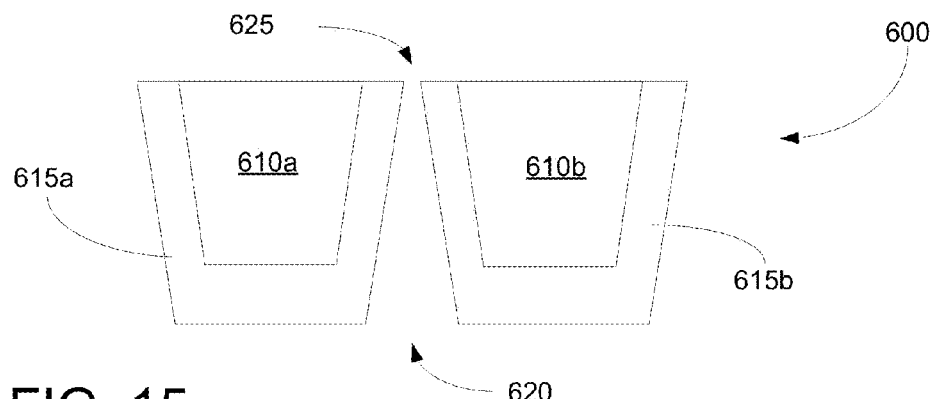
FIG. 15 depicts a schematic of a cross section of another disclosed NFT.

Another example of a NFT that could have one or more portions thereof made of a nitride material can include embodiments such as that depicted in FIG. 15. The NFT 600 in FIG. 15 is a nanorod type NFT where each of the rods includes a non-nitride base layer 615a and 615b on the bottom 620 (opposite the top 625 of the NFT) of the individual rods of the NFT and a nitride core 610a and 610b. In some embodiments, the non-nitride base layers 615a and 615b can be, for example, gold, silver, copper, or alloys thereof. In some embodiments, the non-nitride base layers 615a and 615b can have a thickness of at least 50 nm. In some embodiments, the non-nitride base layers 615a and 615b can have a thickness that is from 1 Å to 100 Å. an embodiment may provide advantages because it is thought that the bottom of the rods of the NFT are the plasmonically active portion of the NFT, and therefore having that region made of relatively more effective plasmonic materials (gold, silver, copper, or alloys thereof) can provide a NFT which has a very high coupling efficiency. Filling the rods (i.e., the nitride cores 610a and 610b) with a nitride material, which has a low CTE and low modulus could offer thermo-mechanical advantages. Such an embodiment could offer both higher coupling efficiency and better thermo-mechanical properties.

Figure 16A:
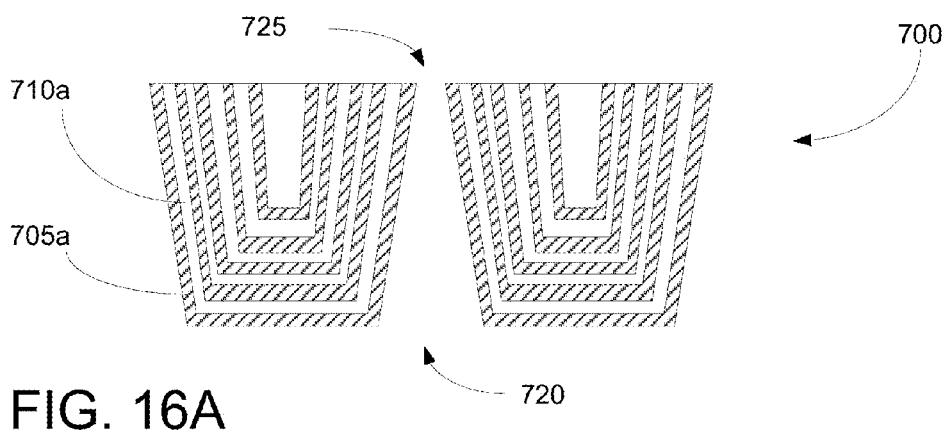
FIGS. 16A and 16B are schematic representations of cross sections of another disclosed near field transducer.
Figure 16B:
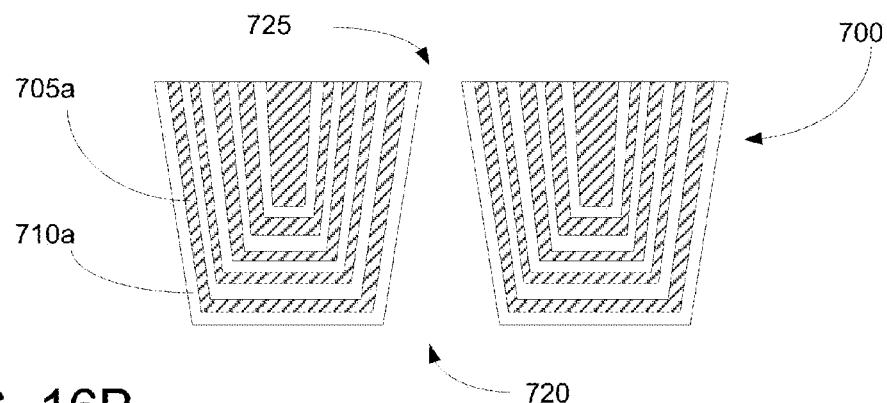

Another example of a NFT that could have one or more portions thereof made of a nitride material can include embodiments such as that depicted in FIGS. 16A and 16B. The NFT 700 depicted in FIG. 16A is a nanorod type NFT where each rod includes a multilayer structure of alternating nitride and non-nitride layers. The embodiment depicted in FIG. 16A includes alternating layers of nitride layers 705a and non-nitride layers 710a. In this embodiment, the nitride layers are the first layer on the bottom 720 (opposite the top 725 of the NFT) of the individual rods of the NFT. The embodiment depicted in FIG. 16B also includes alternating layers of non-nitride layers 710a and nitride layers 705a. In this embodiment, the non-nitride layers are the first layer on the bottom 720 of the individual rods of the NFT. In either of the embodiments depicted in FIGS. 16A and 16B, the non-nitride layers 710a can be, for example, gold, silver, copper, or alloys thereof. In some embodiments, there can be from 1 to 3000 sets of alternating layers of nitride and non-nitride materials. In some embodiments, there can be from 1 to 1000 sets of alternating layers of nitride and non-nitride materials. The individual layers in the NFT may, but need not, have the same thicknesses. Furthermore, any individual layer can have different thicknesses at different points, for example, the region along the bottom of a layer could be a different thickness than the regions along a side or sides of the NFT. In some embodiments, the individual layers can have thicknesses from 1 Å to 1000 Å. In some embodiments, the individual layers can have thicknesses from 1 Å to 100 Å. Such embodiments may offer a way of maximizing coupling efficiency and thermo-mechanical properties.

In some embodiments, an NFT can include a dispersed material in a base material. For example, a nitride material can be dispersed in a non-nitride material (base material) throughout at least a portion of the NFT. Or, for example, an NFT can include a non-nitride material dispersed in a nitride material (base material) throughout at least a portion of the NFT. In some embodiments, a material can be dispersed in a base material in the entirety of the NFT or only in some portion of the NFT. Such embodiments can be utilized with any type of NFT, including for example nanorod type NFTs and lollypop type NFTs. The material (either nitride or non-nitride) that is dispersed in the base material can be doped into the base material, for example. Similarly, the material that is dispersed in the base material can be in the form of nanoparticles. In some embodiments, the nanoparticles can have average diameters from 1 nm to 100 nm, for example. The dispersed material can be formed separately and then dispersed in the base material, or the dispersed material and the base material can be formed at the same time (for example, co-sputtering). In some embodiments, the non-nitride base materials can include, for example, gold, silver, copper, or alloys thereof.

The present disclosure is illustrated by the following examples. It is to be understood that the particular examples, assumptions, modeling, and procedures are to be interpreted broadly in accordance with the scope and spirit of the invention as set forth herein.

EXAMPLES

Figure 17:
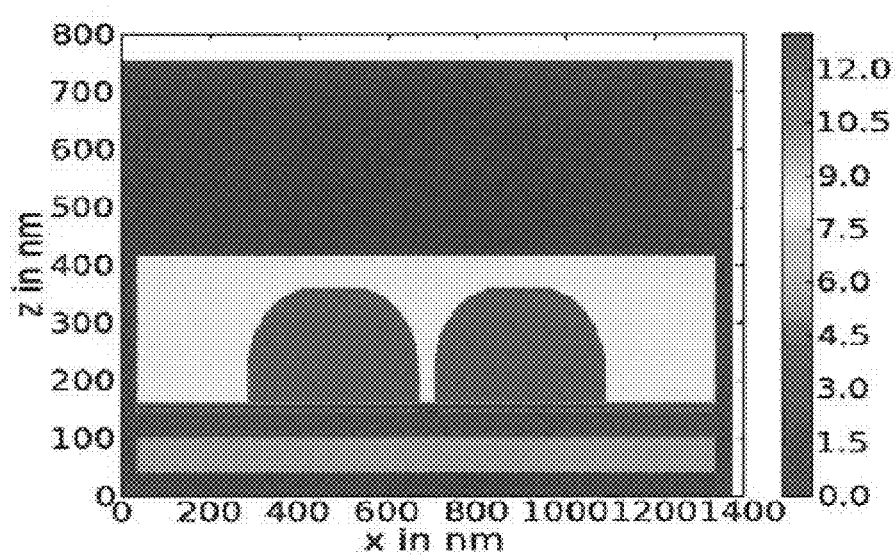
FIG. 17 shows a top down view of a disclosed exemplary device.
Figure 18:
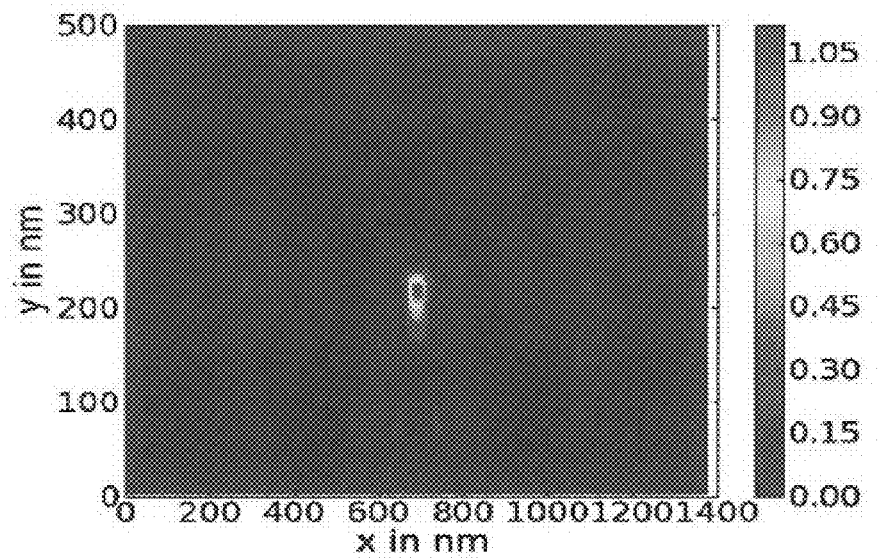
FIG. 18 shows the optical intensity in the media recording layer using a disclosed device.

A nanorod type NFT made entirely of TiN was modeled. The dimensions of the NFT (cross-track width and z height) were chosen with the properties of TiN in mind. FIG. 17 shows a top view of such a device, with the two half circles being the NFT regions. The optical intensity in the media recording layer is shown in FIG. 18. Modeling showed that the coupling efficiency for this design was approximately 30% that of a gold nanorod type NFT (CE=3.85% for Au and CE=1.10% for TiN). However, the acceptability of a NFT design is not entirely based on coupling efficiency; the superior thermo-mechanical properties of the TiN nanorod type NFT could be very beneficial. Similar results would be expected for a ZrN nanorod type NFT.

Growth of stoichiometric, crystalline, and low resistivity metallic TiN or ZrN has required high temperature processing in the past, for example up to about 800° C. using physical vapor deposition (PVD) methods such as direct current (DC) or reactive magnetron sputtering. Low resistivity TiN films have been produced at temperatures as low as about 200° C. by highly ionized sputter deposition techniques such as High Power Impulse Magnetron Sputtering (HiPIMS) power sources. TiN films having resistivity as low as 41.9 µΩ-cm have been obtained. Laser ablation deposition techniques have also been used to produce TiN and ZrN films at temperatures ranging from about 100° C. to about 600° C.

Thus, embodiments of near field transducers including nitride materials are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. An apparatus comprising:
   a near field transducer positioned adjacent to an air bearing surface, the near field transducer comprising an electrically conductive nitride;
   a first magnetic pole; and
   a heat sink positioned between the first magnetic pole and the near field transducer, wherein the heat sink comprises:
      rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

2. The apparatus according to claim 1, wherein the near field transducer comprises TiN, ZrN, TaN, HfN, or combinations thereof.

3. The apparatus according to claim 1, wherein the entire near field transducer comprises the electrically conductive nitride.

4. The apparatus according to claim 3, wherein the near field transducer includes only an electrically conductive nitride.

5. The apparatus according to claim 1, wherein the heat sink comprises Rh, W, or TiN.

6. The apparatus according to claim 1, wherein the near field transducer has a peg and disc structure and only the peg comprises the electrically conductive nitride.

7. The apparatus according to claim 6, wherein the disc of the near field transducer comprises gold.

8. An apparatus comprising:
   a near field transducer positioned adjacent to an air bearing surface of the apparatus, the near field transducer comprising an electrically conductive nitride, and
   wherein the near field transducer comprises a disk and a peg, wherein the peg extends from the disk portion to the air bearing surface of the apparatus;
   a first magnetic pole;
   a heat sink positioned between the first magnetic pole and the near field transducer; and
   a diffusion barrier positioned between the near field transducer and the heat sink, the diffusion barrier comprising rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

9. The apparatus according to claim 8, wherein the diffusion barrier is positioned between the disk portion of the NFT and the heat sink.

10. The apparatus according to claim 8, wherein the heat sink comprises Rh, W, or TiN.

11. The apparatus according to claim 8, wherein the near field transducer comprises TiN, ZrN, TaN, HfN, or combinations thereof.

12. The apparatus according to claim 8, wherein only the peg comprises the electrically conductive nitride.

13. The apparatus according to claim 12, wherein the disc of the near field transducer comprises gold.

14. The apparatus according to claim 8, wherein the entire near field transducer consists essentially of TiN, ZrN TaN, HfN, or combinations thereof.

15. An apparatus comprising:
   a near field transducer positioned adjacent to an air bearing surface, the near field transducer comprising an electrically conductive nitride, and
   wherein the near field transducer comprises an antenna;
   a first magnetic pole;
   a heat sink positioned between the first magnetic pole and the near field transducer; and
   a diffusion barrier positioned between the near field transducer and the first magnetic pole, the diffusion barrier comprising rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

16. The apparatus according to claim 15, wherein the diffusion barrier is spaced from the air bearing surface.

17. The apparatus according to 15, wherein the diffusion barrier comprises a multilayer structure.

18. The apparatus according to claim 15, wherein the diffusion barrier comprises Rh, W, or TiN.

19. The apparatus according to claim 15, wherein the near field transducer comprises TiN, ZrN, TaN, HfN, or combinations thereof.

20. The apparatus according to claim 15, wherein the entire near field transducer consists essentially of TiN, ZrN TaN, HfN, or combinations thereof.

* * * * *